United States Patent
Wong et al.

(10) Patent No.: US 11,287,577 B2
(45) Date of Patent: Mar. 29, 2022

(54) OPTICAL MODE CONVERTER FOR COUPLING BETWEEN WAVEGUIDES WITH DIFFERENT MODE SIZE

(71) Applicant: Cloud Light Technology Limited, Hong Kong (HK)

(72) Inventors: Chi Yan Wong, Hong Kong (HK); Vivian Wei Ma, Hong Kong (HK); Yat Hin Chan, Hong Kong (HK); Yuk Nga Chen, Hong Kong (HK); Vincent Wai Hung, Hong Kong (HK)

(73) Assignee: Cloud Light Technology Limited, Hong Kong (HK)

( * ) Notice: Subject to any disclaimer, the term of this patent is extended or adjusted under 35 U.S.C. 154(b) by 0 days.

(21) Appl. No.: 16/446,685

(22) Filed: Jun. 20, 2019

(65) Prior Publication Data

US 2019/0391336 A1    Dec. 26, 2019

Related U.S. Application Data

(60) Provisional application No. 62/687,776, filed on Jun. 20, 2018.

(51) Int. Cl.
    *G02B 6/30*    (2006.01)
    *G02B 6/12*    (2006.01)
    *G02B 6/14*    (2006.01)

(52) U.S. Cl.
    CPC ......... *G02B 6/305* (2013.01); *G02B 6/12002* (2013.01); *G02B 6/14* (2013.01)

(58) Field of Classification Search
    CPC .................................. G02B 6/26; G02B 6/305
    USPC ........................................ 385/28, 30, 31, 43
    See application file for complete search history.

(56) References Cited

U.S. PATENT DOCUMENTS

| | | | |
|---|---|---|---|
| 9,703,047 B2* | 7/2017 | Painchaud | G02B 6/305 |
| 10,197,731 B2* | 2/2019 | Teng | G02B 6/3881 |
| 10,197,734 B2* | 2/2019 | Painchaud | G02B 6/14 |
| 10,345,524 B2* | 7/2019 | Jiang | G02B 6/14 |
| 2004/0037497 A1* | 2/2004 | Lee | G02B 6/1228 385/28 |
| 2015/0277036 A1* | 10/2015 | Jiang | G02B 6/136 385/43 |

* cited by examiner

*Primary Examiner* — Robert Tavlykaev

(57) ABSTRACT

An optical mode converter for coupling between photonic integrated circuit (PIC) and optical fiber of different mode sizes is illustrated. The optical mode converter includes a waveguide assembly including a Single waveguide structure, a Multi-layer waveguide structure, and a Transitional waveguide structure. The Single waveguide structure includes a single waveguide. The dimension and propagation constant of a first end, of the single waveguide, is similar to a waveguide of a photonic integrated circuit (PIC). Furthermore, the Multi-layer waveguide structure included a multi-layer waveguide. Further, the Transitional waveguide structure is formed at a transitional structure. The Transitional waveguide structure allows transition of an optical mode between the Single waveguide structure and Multi-layer waveguide structure. The Multi-layer waveguide structure is configured for coupling light between the Transitional waveguide structure and an optical fiber and the Single waveguide structure is configured for coupling the light between the PIC and the Transitional waveguide structure.

14 Claims, 11 Drawing Sheets

OPTICAL MODE CONVERTER FOR COUPLING BETWEEN WAVEGUIDES WITH DIFFERENT MODE SIZE

CROSS REFERENCE TO RELATED APPLICATION

The present application claims priority from U.S. Provisional Patent Application. No. 62/687,776 filed on Jun. 20, 2018, the entirety of which is incorporated herein by a reference.

TECHNICAL FIELD

The present application relates to an optical module involving an integrated photonic device, and particularly relates to the connection of an optical fiber and an integrated photonic component.

BACKGROUND

Fast-growing cloud computing and artificial intelligent applications are driving the internet tech giants to build powerful data centers. Building mega data centers are, by far, more cost effective and less complicated than building a number of moderate size data centers for scaling up processing power. However, for transmitting huge volume of data at ultra-high speed, server nodes/racks in data centers require high transmission bandwidth. Traditionally, the interconnect is implemented by using copper cables and electrical transceiver for transmitting and receiving data in the form of electrical signals. Such electrical solution is very bulky, and the transmission distance is less than 20 meters (m) at data rate of 10 Gigabits per second (Gbps).

Given that optical solutions have clear advantages in having smaller footprints and longer transmission distance of up to 300 m at 10 Gbps, optical-fibers networks have taken the place of copper-based networks over the years. Conventional optical transceivers in data centers are mostly multi-mode fiber (MMF). Typical multi-mode fiber links have data rates of 10 Megabits per second (Mbps) to 10 Gbps over link lengths of up to only 600 m. However, it is not uncommon that interconnect of nodes in today's Mega data centers readily exceeds a distance of 500 m to 2 km. As a result, single mode transceivers for single-mode light transmission are in great demand to connect optical fibers between the nodes. Conventional single-mode transceivers are made of a number of high cost discrete optical components. They have large footprint and require high cost assembly process and maintenance.

With the emergence of Silicon Photonics (SiPh) technology, a possibility of low cost and small footprint solution for high volume implementation of interconnects exceeding 500 m to 2 km has increased. SiPh technology applies the state-of-the-art complementary metal-oxide-semiconductor (CMOS) foundry process to fabricate photonic integrated circuit (PIC) device with most of the optical components integrated onto a single silicon chip. However, the optical mode size (the spot size of the light in waveguide) of SiPh chip (also known as Si PIC) input/output (I/O) port is in the order of 1 µm while single mode fiber (SMF) is about 10 µm. Such large difference in mode size introduces large optical power loss in butt coupling (head-to-head coupling between Si PIC I/O port and SMF). The optical power loss of conventional coupling methods from PIC to optical fiber, PLC (conventional glass-based planner lightwave circuit) and edge emitting laser diode, is quite high (more than 50%).

The major reason is that the optical mode size of a waveguide in a PIC is much smaller than that of an optical fiber, PLC and laser diode. Traditional coupling method uses discrete free-space optical components such as micro-sized lens to convert the mode size. This high cost approach is not a viable solution to this problem. Unless this coupling problem is solved, SiPh technology would not be the solution for high volume implementation SMF interconnects.

SUMMARY

The summary is provided to introduce concepts related to an optical mode converter for coupling between waveguides with different mode size. This summary is not intended to identify essential features of the claimed subject matter nor is it intended for use in determining or limiting the scope of the claimed subject matter.

In one implementation, an optical mode converter for coupling between photonic integrated circuit (PIC) and one of optical fiber, a planar lightwave circuit (PLC), and a laser diode of different mode sizes is illustrated. The optical mode converter comprises a waveguide assembly comprising a Single waveguide structure, a Multi-layer waveguide structure, and a Transitional waveguide structure. The Single waveguide structure comprises a single waveguide. The dimension and propagation constant of a first end, of the single waveguide, is similar to a waveguide of a photonic integrated circuit (PIC). Furthermore, the Multi-layer waveguide structure comprises a multi-layer waveguide. Further, the Transitional waveguide structure is formed at the transitional structure. The Transitional waveguide structure allows transition of an optical mode between the Single waveguide structure and Multi-layer waveguide structure, wherein waveguide axis of Single waveguide structure is positioned approximately at the center of the Multi-layer waveguide structure. Furthermore, the Multi-layer waveguide structure is configured for coupling light between the Transitional waveguide structure and an optical fiber and wherein the Single waveguide structure is configured for coupling the light between the PIC and the Transitional waveguide structure.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

The present application is intended to decrease the optical power coupling loss between a photonic integrated circuit (PIC) and an optical fiber by converting the optical mode size without significant power loss. The present application also simplifies the assembly process from free-space optical coupling to conventional planar lightwave circuit (PLC) assembly process. In other words, the present application aims to minimize the optical power loss of coupling between PIC and optical fiber and simplify the assembly process to conventional PLC assembly process.

Figure 1:
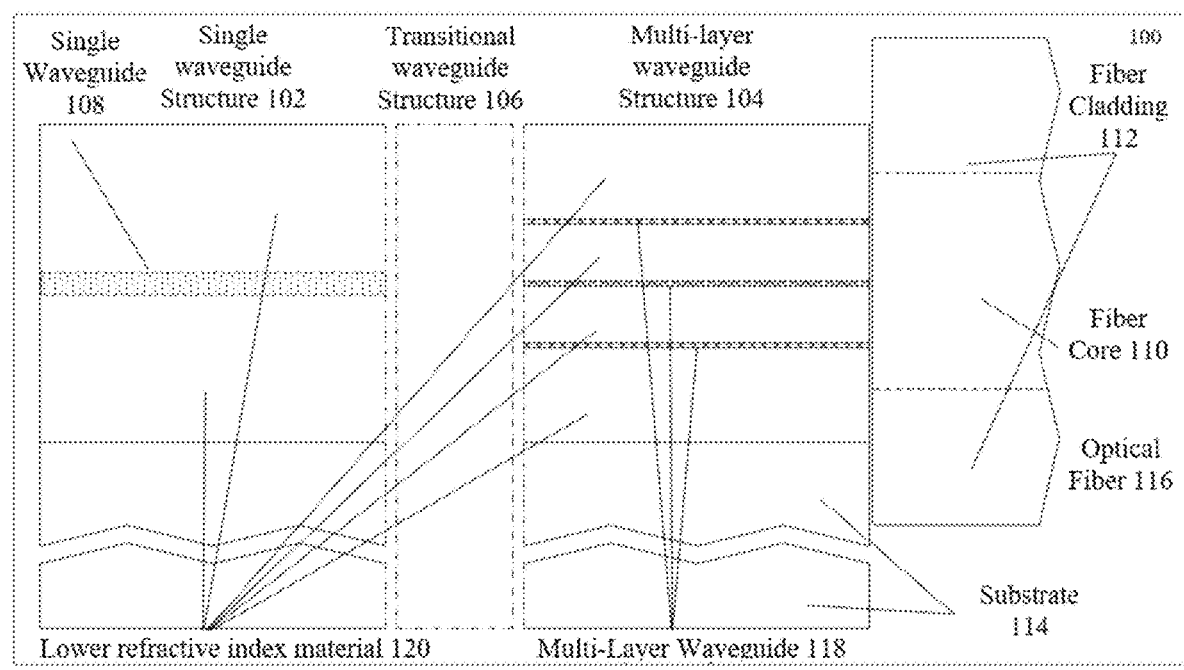
FIG. 1 illustrates schematic side view of an optical mode converter, in accordance with an embodiment of the invention.
Figure 2:
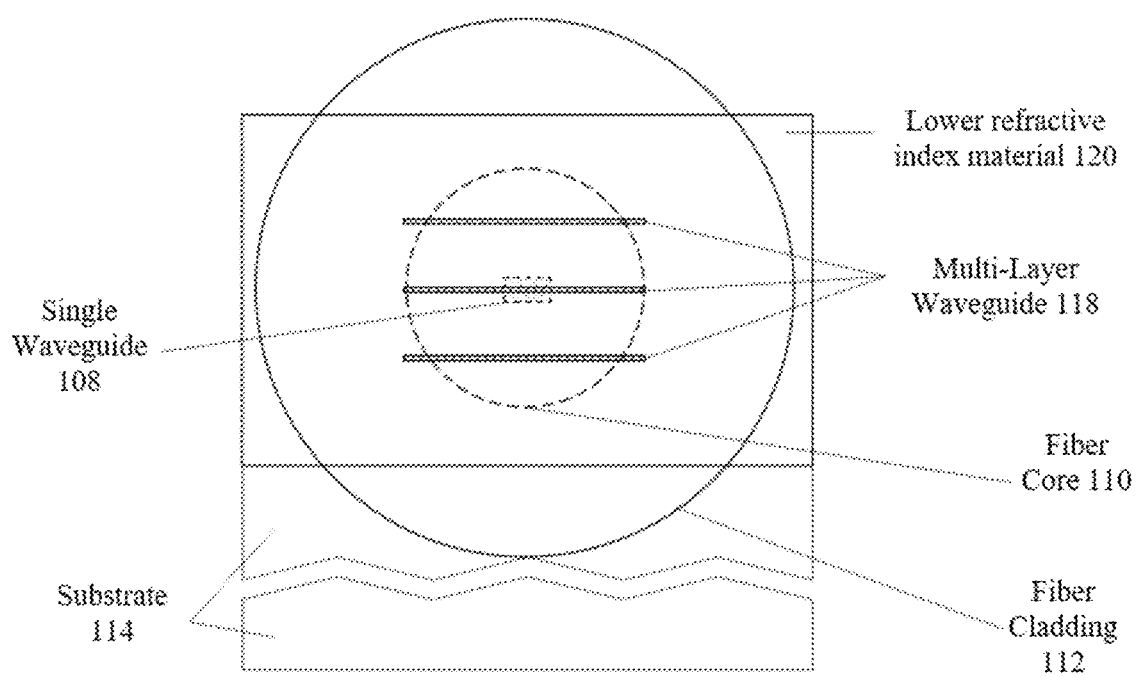
FIG. 2 illustrates schematic cross-sectional view of the optical mode converter, in accordance with an embodiment of the invention.

In one embodiment, an optical mode converter for coupling between waveguides with different mode size is disclosed. The mode converter may be configured for coupling between PIC and single-mode fiber. The optical mode converter is preferably fabricated in the PIC device for optical mode conversion between PIC and a single mode fiber. The PIC device may be a silicon photonic device. The optical mode converter may contain three parts of a waveguide assembly. The schematic side view of the optical mode converter 100 is represented in FIG. 1. Whereas, FIG. 2 represents cross-sectional side view of the optical mode converter 100, in accordance with an embodiment of the invention.

The optical mode converter 100 comprises the waveguide assembly with three zones/parts namely a Single waveguide structure 102, a Multi-layer waveguide structure 104, and Transitional waveguide structure 106. It must be noted that the three parts are just an illustration for different functional areas of the optical mode converter 100 and there are no physical boundaries between all the three parts. The three parts can be a single element. In one embodiment, the Single waveguide structure 102 includes a single waveguide 108 with a first end and a second end. The first end of the single waveguide 108 in the Single waveguide structure 102 has similar dimension and propagation constant as that of a PIC waveguide. The single waveguide 108 is surrounded by a Lower refractive index material layer 120. The Single waveguide structure 102 couples the light between the single waveguide 108 and a transitional structure. The transitional structure is a structure formed between the Single waveguide structure 102 and Multi-layer waveguide structure 104 hereafter referred to as the Transitional waveguide structure 106.

In one embodiment, the Multi-layer waveguide structure 104 comprises a multi-layer waveguide 118. Multiple layers of multi-layer waveguide 118 are formed of a dielectric material of high dielectric constant and are embedded in a material with relatively lower dielectric constant. The multi-layer waveguide 118 may be formed of multiple high refractive index material layer. It must be noted that both the single waveguide 108 and multi-layer waveguide 118 are separated by lower refractive index material layer 120 as represented in FIG. 1. Furthermore, the optical mode of each layer structure in the multi-layer waveguide 118 combined together forms a larger optical super-mode matching the optical mode size and propagation constant of optical fiber 116, glass-based PLC, and the like. The thickness of each layer in the multi-layer waveguide 118 may or may not be the same. The shape of the layer in the multi-layer waveguide 118 may or may not be the same. The material of each layers of multi-layer waveguide 118 may or may not be the same. The material of the layers of Multi-layer waveguide structure 104 and the single waveguide 108 may or may not be the same.

In one embodiment, the Transitional waveguide structure 106 is a waveguide structure present at the transitional structure and allows for the transition of the optical mode between the Single waveguide structure 102 and Multi-layer waveguide structure 104. In one embodiment, the waveguide axis of Single waveguide structure 102 is around the middle of the Multi-layer waveguide structure 104. However, it must be noted that there are multiple options of the Transitional waveguide structure 106. The Transitional waveguide structure 106 is basically a region where the single waveguide 108 and the multi-layer waveguide 118 extend and overlap each other, wherein the Transitional waveguide structure 106 acts as a coupling region/transitional structure. The structure and dimensions of the overlapping portions of the single waveguide 108 and the multi-layer waveguide 118 at the Transitional waveguide structure 106 may be different for different applications. Some but not limited examples of the variations in the structure and dimensions of the overlapping portions of the single waveguide 108 and the multi-layer waveguide 118 at the Transitional waveguide structure 106 are represented with respect to FIGS. 3 to 11.

Figure 3A:
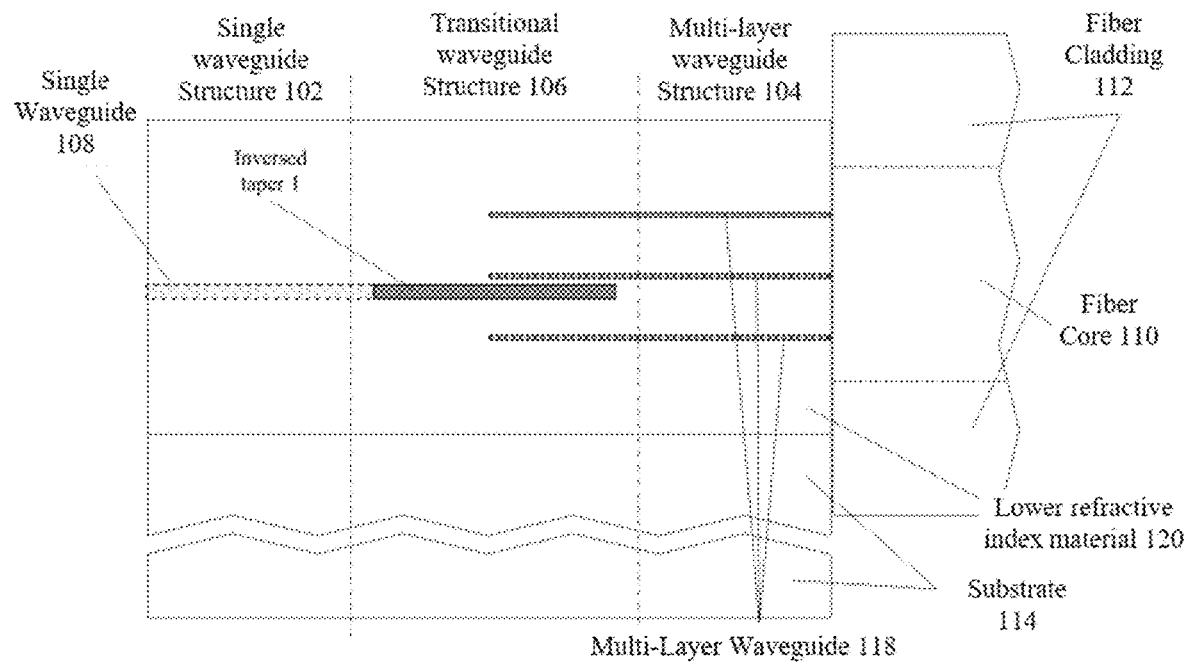
FIGS. 3a and 3b illustrates side view and top view of a variation of the optical mode converter, in accordance with an embodiment of the invention.
Figure 3B:
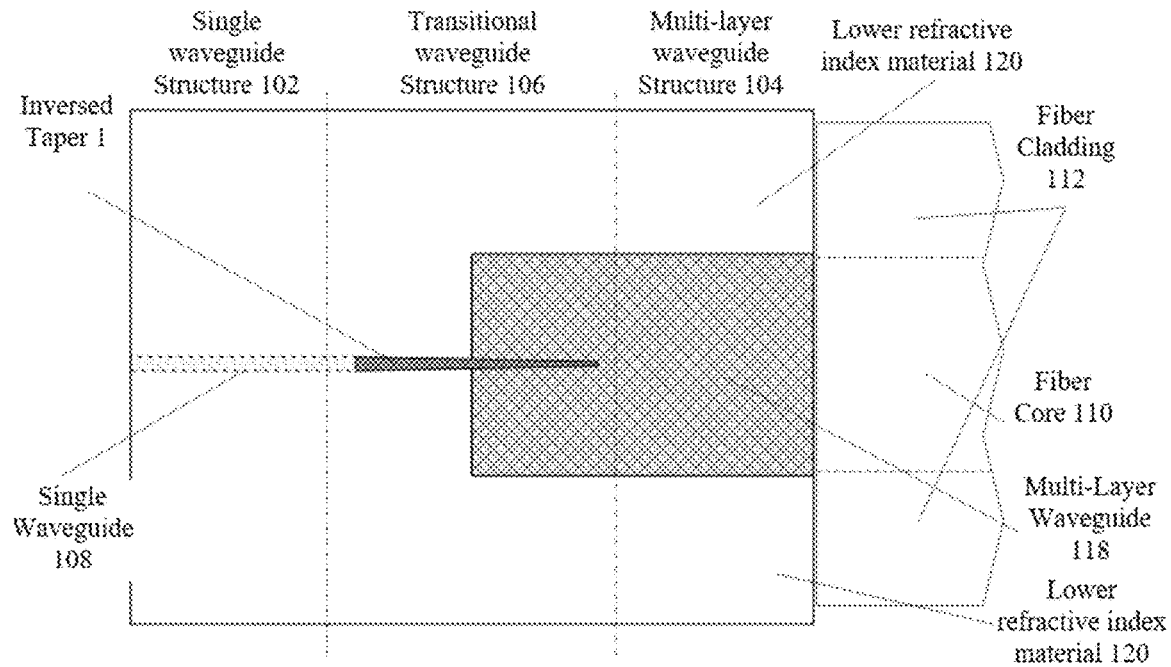

FIGS. 3a and 3b represents the side and top views of the optical mode converter 100, the single waveguide 108 in the Single waveguide structure 102 is connected to structure of dielectric represented as a first inversed taper present in the Transitional waveguide structure 106. The first inversed taper will be hereinafter referred as "inversed taper 1". The inversed taper 1 extends toward the Multi-layer waveguide structure 104 and is surrounded by the extensions of the multi-layers of the Multi-layer waveguide structures 104, wherein the inversed taper 1 is positioned approximately at the center of the Multi-layer waveguide structure 104. The cross-section area of the inversed taper 1 decrease while approaching the Multi-layer waveguide structure 104. The optical mode size increases as the cross-sectional area of the inversed taper 1 decreases. The light in the inversed taper 1 with expanded optical mode couples to the multi-layer waveguide 118 via evanescent field coupling and forms the large area optical mode when propagating in the Multi-layer waveguide structure 104.

In one embodiment, if there is an odd number of layer(s) in the Multi-layer waveguide structure 104, the layer around the center of the optical mode is placed either below or above the inversed taper 1 such that the inversed taper 1 and at least one layer of the Multi-layer waveguide structure 104 overlapped vertically in the Transitional waveguide structure 106. In one embodiment the inversed taper 1 and at least one layer of the Multi-layer waveguide structure 104 may not be in direct contact with each other and may be separated by a thin layer of the Lower refractive index material 120.

Figure 4A:
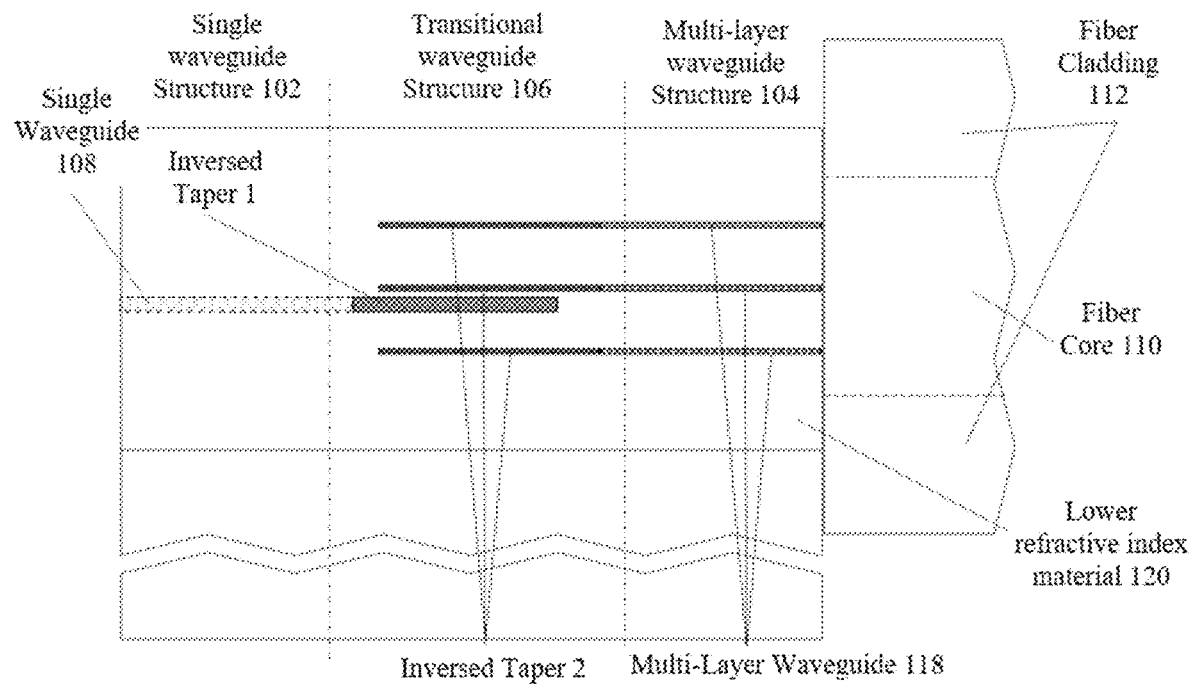
FIGS. 4a and 4b illustrates overlap between inversed taper formed at a Single waveguide structure and Multi-layer waveguide structure in the optical mode converter, in accordance with an embodiment of the invention.
Figure 4B:
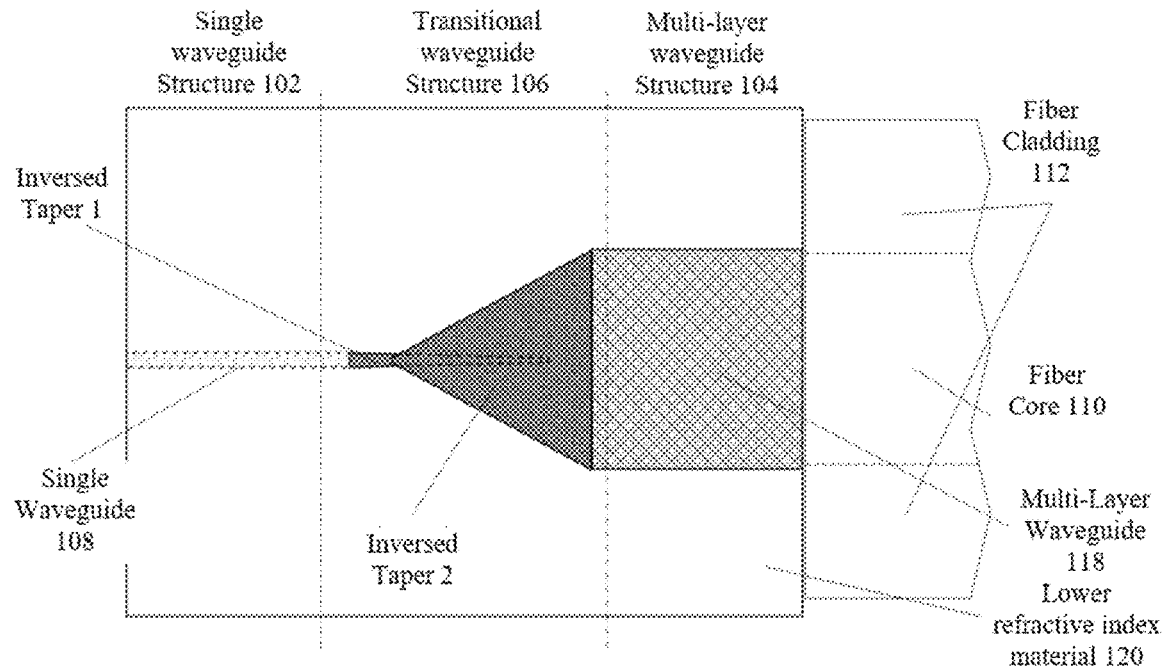

Referring now to FIGS. 4a and 4b, the multi-layer waveguide 118, in the Multi-layer waveguide structure 104, is extended as second inversed tapers. The second inversed tapers will be hereinafter referred as the inversed tapers 2, wherein the inversed tapers 2 extend into the Transitional waveguide structure 106. This inversed taper(s) 2 extend(s) toward the Single waveguide structure 102 and then surrounding the inversed taper 1 from the Single waveguide structure 102 in the Transitional waveguide structure 106. In one embodiment, the width(s) or cross-section area(s) of the inversed taper(s) 2 from the Multi-layer waveguide structure 104 decreases while approaching toward the Single waveguide structure 102 in the Transitional waveguide structure 106.

Figure 5A:
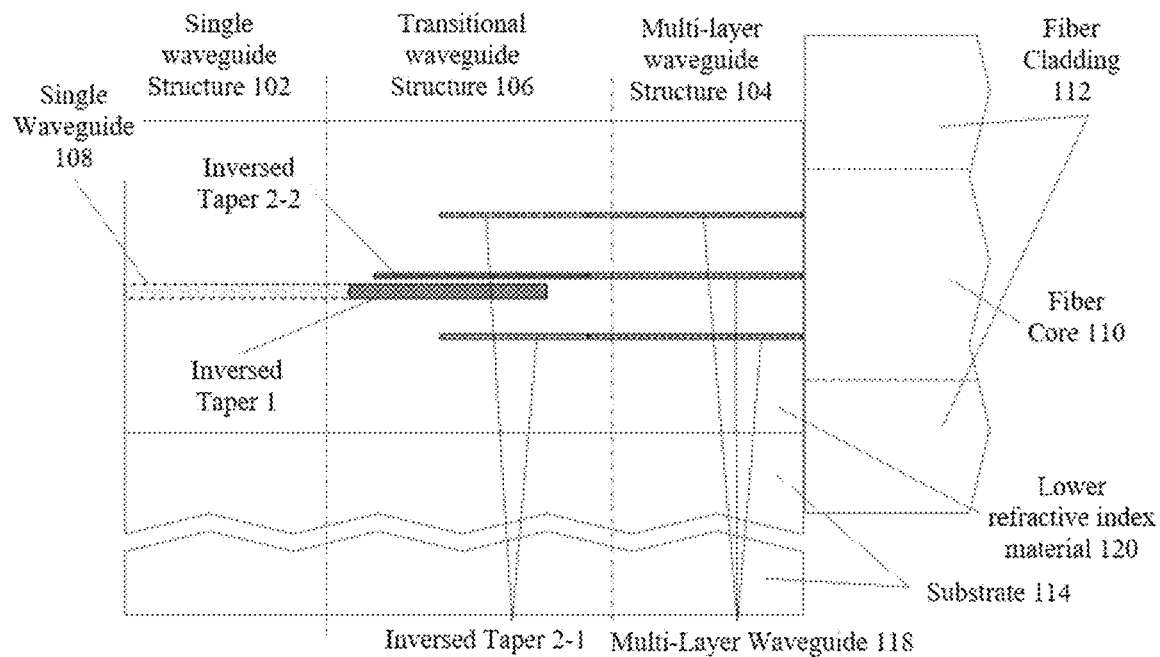
FIGS. 5a and 5b illustrates variation in length of inversed taper formed at the Multi-layer waveguide structure, in accordance with an embodiment of the invention.
Figure 5B:
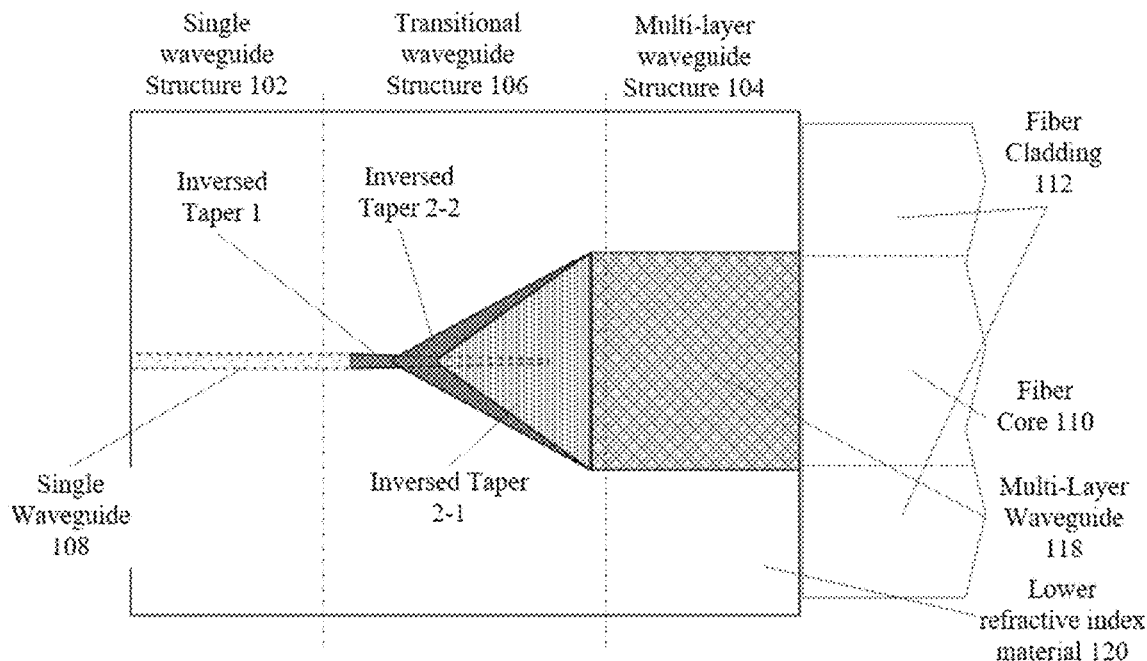

In one embodiment, the inversed tapers 2 of the Multi-layer waveguide structure 104 may not necessary having the same shapes. It is to be noted that, two or more layers of the multi-layer waveguide structure 104 are extended and connected to the inversed tapers 2 in the transitional waveguide structure 106, wherein dimensions of the inversed tapers 2 corresponding to the two or more layers are different. FIGS. 5a and 5b represents variation in shape of the inversed tapers 2 formed at the multiple layers of the multi-layer waveguide 118. As represented in FIGS. 5a and 5b the inversed tapers 2-1 associated with the top layer in the multi-layer waveguide 118 has different shape/dimensions as compared to inversed taper 2-2 associated with middle layer in the multi-layer waveguide 118. The inversed tapers 2-1 and inversed taper 2-2 end at different position in the Transitional waveguide structure 106. In this kind of super mode structure, the optical mode size decreases as the width or cross-section area of the waveguide device decreases. The light in the inversed taper(s) 2 from Multi-layer waveguide structure couples to the inversed taper 1 from the Single waveguide structure, via evanescent field coupling and forms the small area optical mode when propagating in the Single waveguide structure 102.

Figure 6:
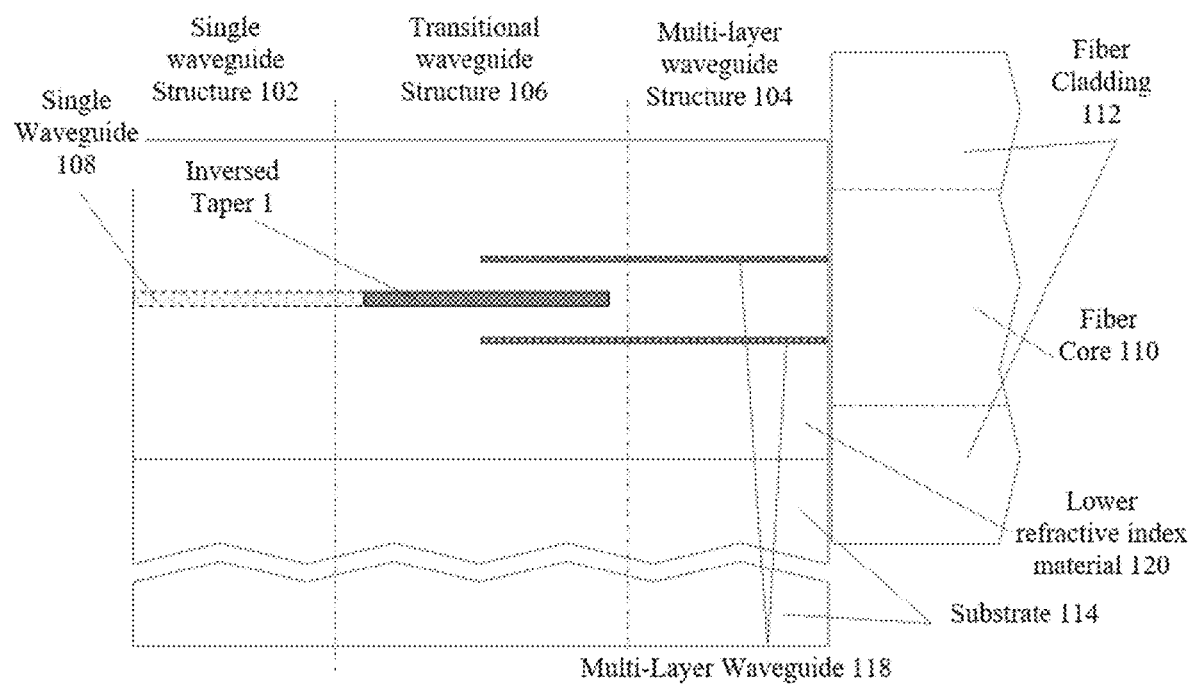
FIG. 6 illustrates side view of the optical mode converter with even number of layers at the Multi-layer waveguide structure, in accordance with an embodiment of the invention.

In one embodiment, the number of layers in the Multi-layer waveguide structure 104 may be even. FIG. 6 represents even number of layers in the multi-layer waveguide 118 of the Multi-layer waveguide structure 104. If there is an even number of layers, the inversed taper 1 in the Transitional waveguide structure 106 may be placed around the middle of the extension of multi-layer waveguide 118 from the Multi-layer waveguide structure 104 such that the position of the inversed taper 1 is close to the center of optical mode converter, as shown in sectional-view of the optical mode converter of FIG. 6.

Figure 7A:
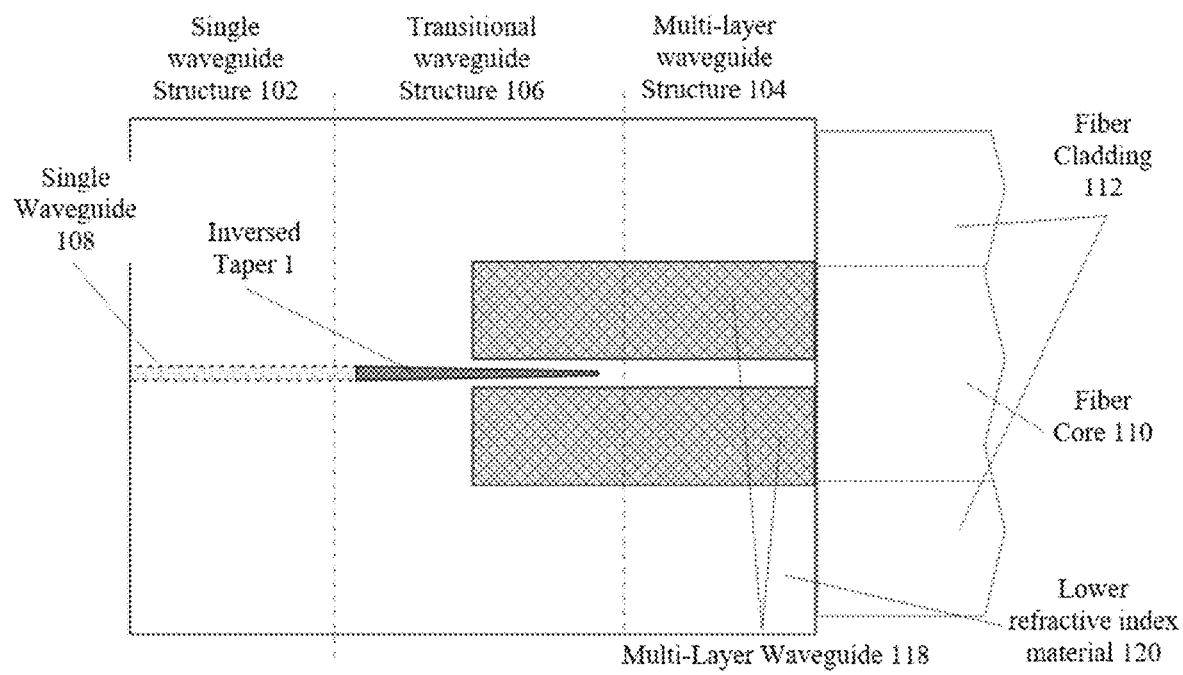
FIGS. 7a and 7b illustrates a top view of two waveguides in each layer of the Multi-layer waveguide structure, in accordance with an embodiment of the invention.
Figure 7B:
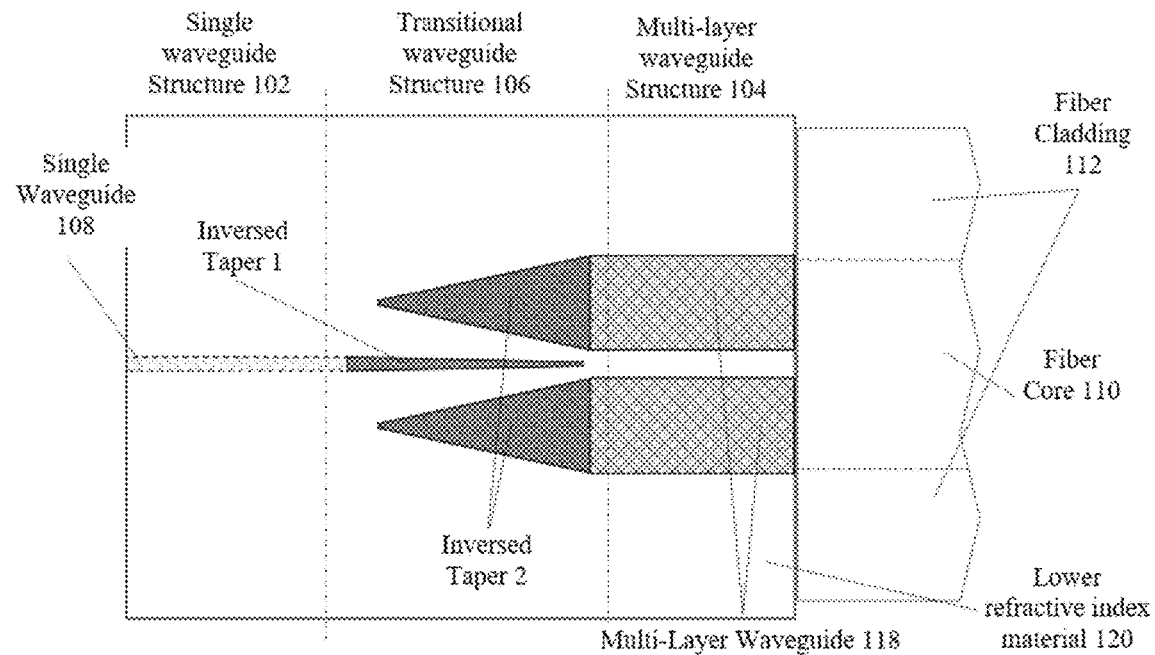

In one embodiment, each layer of the Multi-layer waveguide structure 104 is not limited to having one single waveguide. The Multi-layer waveguide structure 104 may be consisted of multiple waveguides along the waveguide axis in the same vertical level. The number of waveguides at each layer may be even. The FIG. 7a represents a top-view of the optical mode converter 100 with two waveguides in each layer of the Multi-layer waveguide structure 104. FIG. 7b represents another variant of the Multi-layer waveguide structure 104, wherein the waveguides in the same vertical level are connected/extended to inversed taper(s) 2 in the Transitional waveguide structure 106.

Furthermore, in case if number of layers in the multi-layer waveguide 118 is odd and number of waveguides at each layer is even, then the waveguide of the Single waveguide structure 102 has the same vertical position of the layer at the center of in the multi-layer waveguide 118.

Figure 8:
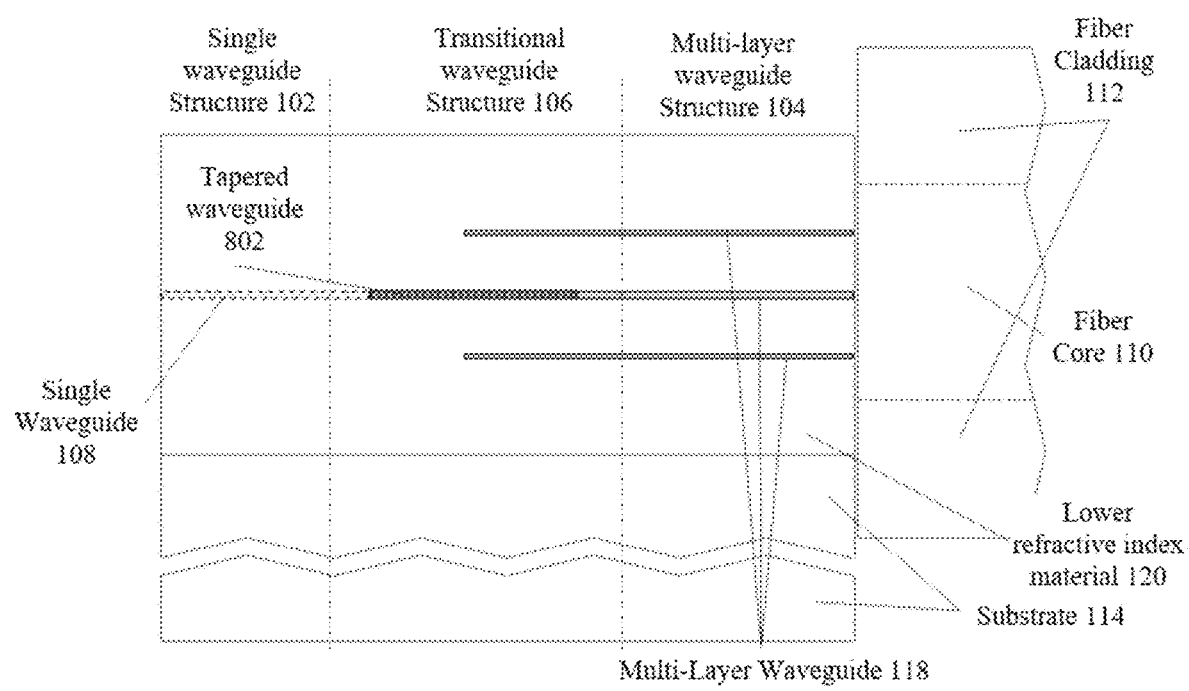
FIG. 8 illustrated a tapered waveguide connecting the single waveguide and middle layer of the Multi-layer waveguide structure, in accordance with an embodiment of the invention.

In one embodiment, a waveguide in the Transitional waveguide structure 106 may be in direct contact with the waveguides in the Multi-layer waveguide structures 118 and the single waveguide 108. As represented in FIG. 8, a tapered waveguide 802 at the Transitional waveguide structure 106 is in direct contact with the single waveguide 108 of Single waveguide structure 102 and middle layer in the Multi-layer waveguide structure 104. It must be noted that the tapered waveguide 802, the single waveguide 108, and the middle layer of the Multi-layer waveguide structure 104 are coplanar and having the same height in this case.

Figure 9A:
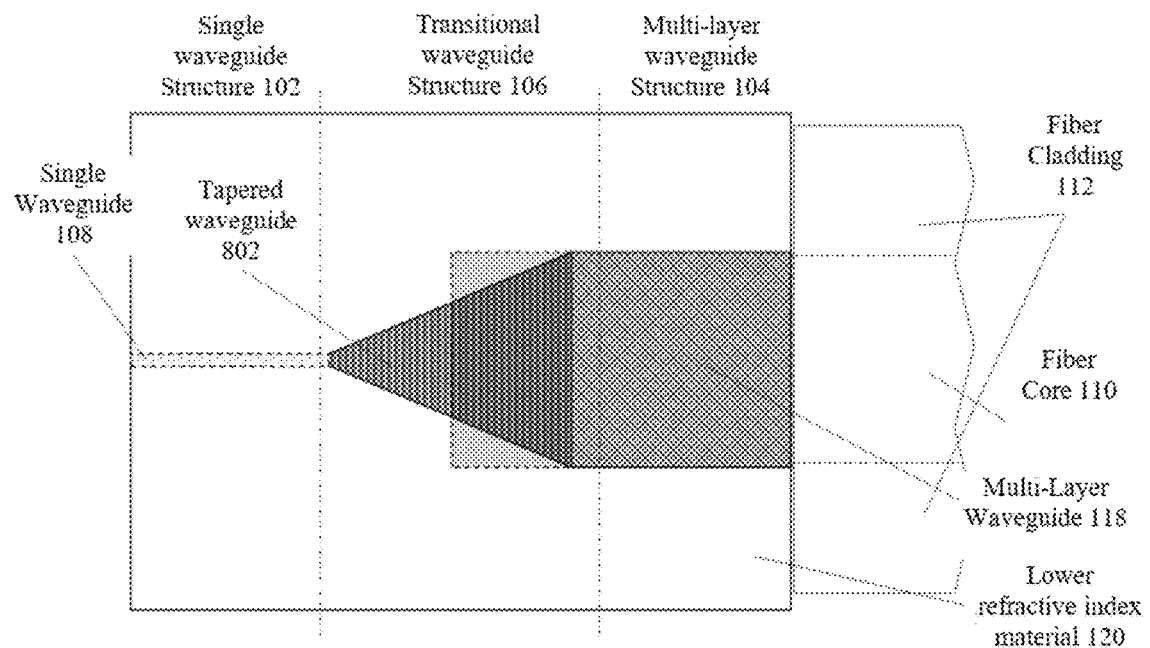
FIGS. 9a and 9b illustrates top view of the tapered waveguide connecting the single waveguide and middle layer in the Multi-layer waveguide structure, in accordance with an embodiment of the invention.
Figure 9B:
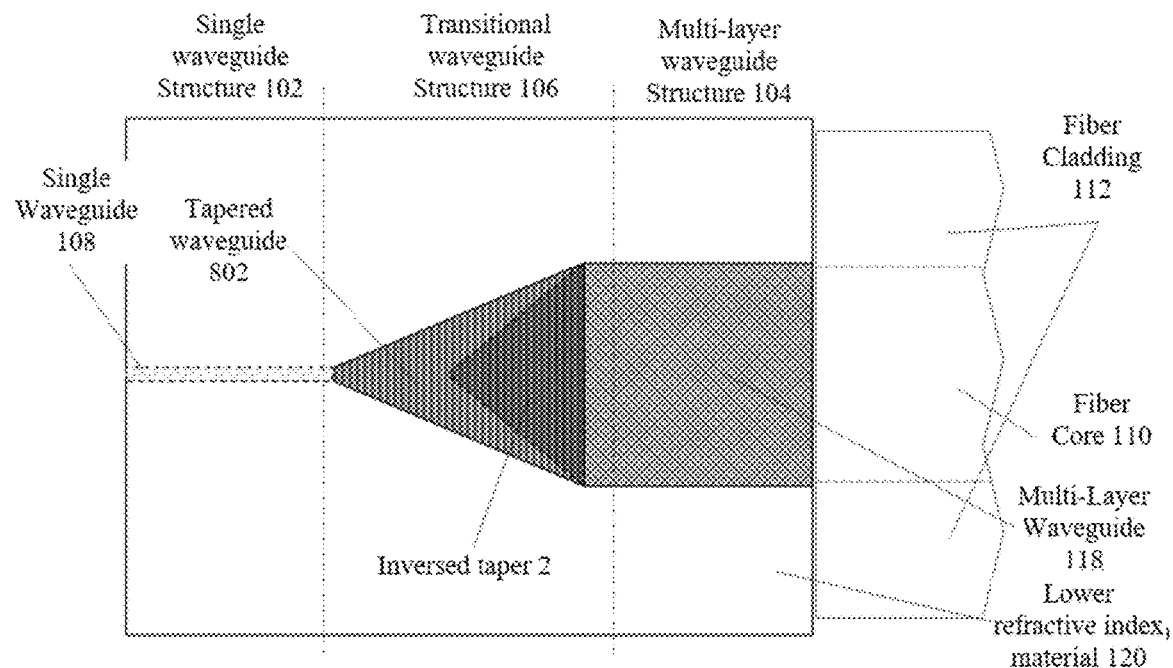

FIG. 9a represents top view of the tapered waveguide 802 connecting the single waveguide 108 and middle layer in the Multi-layer waveguide structure 104. As represented in FIG. 9a, the tapered waveguide 802 of the Transitional waveguide structure 106 is a tapered structure, with one end having the same area as the single waveguide 108, of the Single waveguide structure 102, and expands in width toward the waveguide layer around the center of the optical mode in the Multi-layer waveguide structure 104 until it matches the width/area of the waveguide at the center of the Multi-layer waveguide structure 104. FIG. 9b represents another variation, wherein the rest of the waveguide layers from Multi-layer waveguide structure 104 are connected to inversed taper(s) 2 in Transitional waveguide structure 106.

Figure 10A:
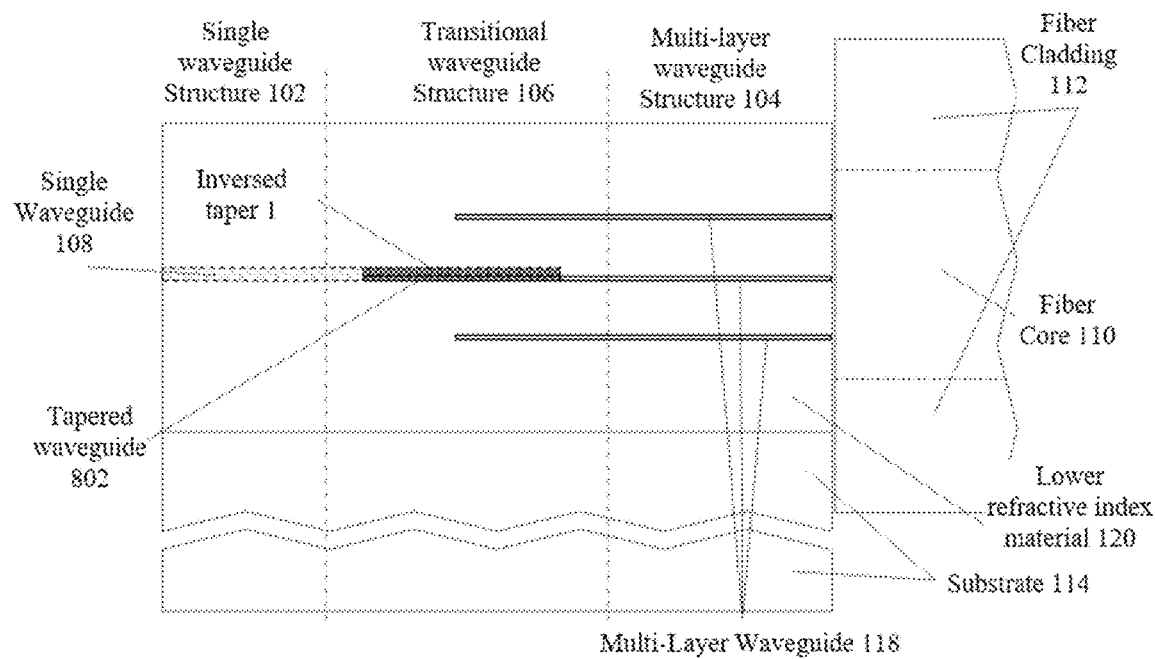
FIGS. 10a and 10b illustrates front view and top view of the overlap between the tapered waveguide and inversed taper at the Transitional waveguide structure, in accordance with an embodiment of the invention.
Figure 10B:
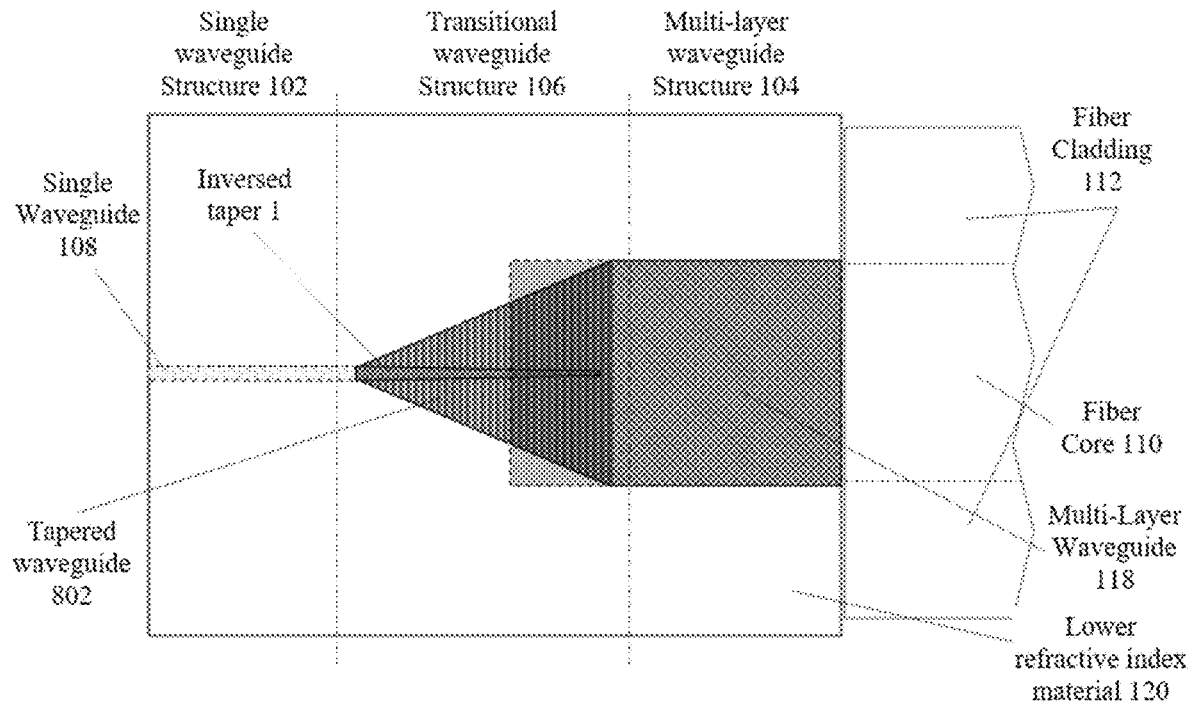

In one embodiment, the single waveguide 108 of the Single waveguide structure 102 may have the same vertical position of the layer around the center of the optical mode in an odd number-of-layer of the Multi-layer waveguide structure 104, but their waveguide heights may not match. In such case, one part of the single waveguide 108 at the Single waveguide structure 102 may connects to the tapered waveguide 802 in the Transitional waveguide structure 106 and the other part, caused by extra height, of the single waveguide 108 is connected to an inversed taper 1 interposed on the tapered waveguide 108 which expands to match and connect the waveguide layer around the center of the optical mode in the Multi-layer waveguide structure 104 for better optical mode conversion, as shown in FIGS. 10a and 10b.

Figure 11:
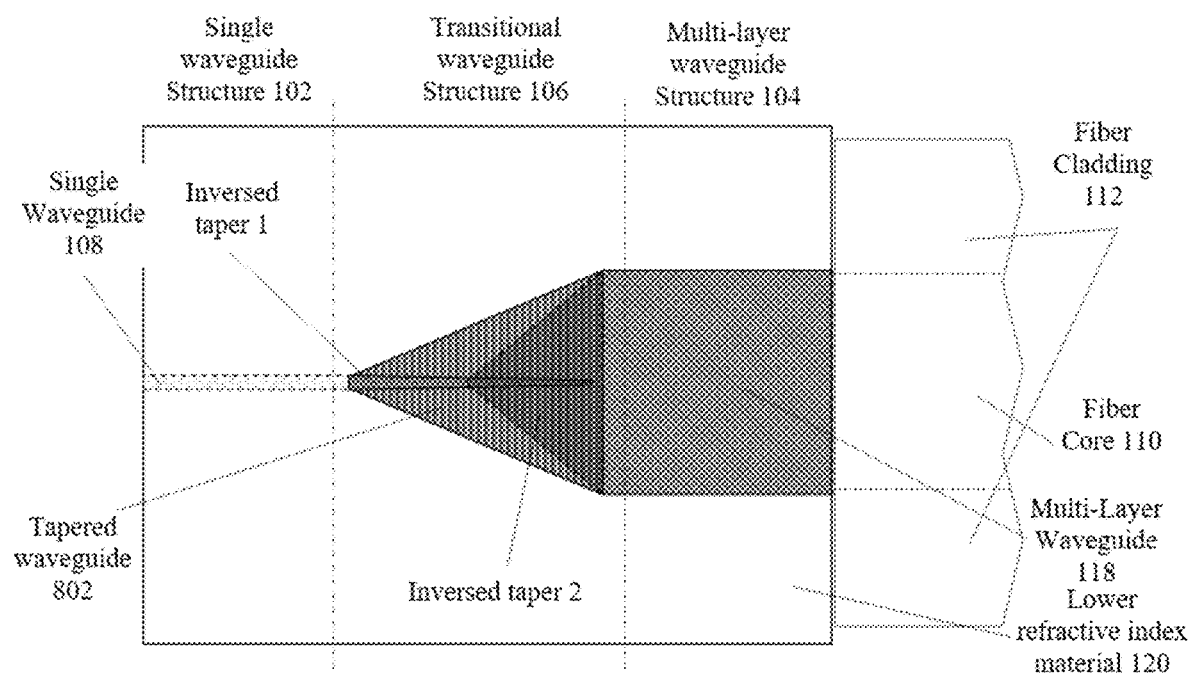
FIG. 11 illustrates top view of the overlap between the tapered waveguide and inversed taper at the Transitional waveguide structure, in accordance with an embodiment of the invention.

FIG. 11 represents another variant of the Multi-layer waveguide structure 104 of FIG. 10, wherein the rest of the waveguide layers from Multi-layer waveguide structure 104 are connected to inversed taper(s) 2 in the Transitional waveguide structure 106.

Although implementations of optical mode converter for coupling between photonic integrated circuit (PIC) and optical fiber of different mode sizes have been described in language specific to structural features, it is to be understood that the appended claims are not necessarily limited to the specific features. Rather, the specific features are disclosed as examples of implementations of optical mode converter for coupling between photonic integrated circuit (PIC) and optical fiber of different mode sizes.

We claim:

1. An optical mode converter for coupling between a photonic integrated circuit (PIC) and one of an optical fiber, a planar lightwave circuit (PLC), and a laser diode of different mode sizes, the optical mode converter comprising:
   a waveguide assembly comprising:
     a Single waveguide structure with a single waveguide, wherein a dimension and a propagation constant of a first end, of the single waveguide, are similar to those of a waveguide of a photonic integrated circuit (PIC);
     a Multi-layer waveguide structure with a multi-layer waveguide;
     a Transitional waveguide structure, with a first inversed taper, wherein the Transitional waveguide structure allows transition of an optical mode between the Single waveguide structure and the Multi-layer waveguide structure, wherein the Multi-layer waveguide structure is configured for coupling light between the Transitional waveguide structure and an optical fiber, wherein the first inversed taper is substantially sandwiched vertically between outermost layers of the multi-layer waveguide, such that at least one layer of the multi-layer waveguide is above the first inversed taper and at least one layer of the multi-layer waveguide is below the first inversed taper, wherein the layers in the multi-layer waveguide are separated by a lower refractive index material, wherein the first inversed taper and the layers of the multi-layer waveguide are overlapped vertically in the Transitional waveguide structure, and wherein the first inversed taper and the layers, of the Multi-layer waveguide structure, above and below the first inversed taper are separated by a thin layer of the lower refractive index material, and positioned approximately along an optical mode center of the multi-layer waveguide structure, wherein the Single waveguide structure is configured for coupling the light between the PIC and the Transitional waveguide structure, wherein a layer around the optical mode center of the Multi-layer waveguide structure is placed either below or above the first inversed taper, when the number of layers in the Multi-layer waveguide structure is odd, and wherein the first inversed taper in the Transitional waveguide structure is placed around a middle of an extension of multi-layers from the Multi-layer waveguide structure, when the number of layers in the Multi-layer waveguide structure is even;
     wherein the single waveguide is disposed at a shortest distance to the layer around the optical mode center of the Multi-layer waveguide structure compared to all of the other layers of the Multi-layer waveguide structure.

2. The optical mode converter of claim 1, wherein a waveguide axis of the Single waveguide structure is approximately at the optical mode center of the Multi-layer waveguide structure.

3. The optical mode converter of claim 1, wherein the multi-layer waveguide, of the Multi-layer waveguide structure, is of a dielectric material embedded in a material with a relatively lower dielectric constant.

4. The optical mode converter of claim 1, wherein optical modes of the layers in the multi-layer waveguide, of the Multi-layer waveguide structure, combined together form a larger optical super-mode matching an optical mode size and a propagation constant of the optical fiber.

5. The optical mode converter of claim 1, wherein a thickness and a shape of each layer of the multi-layer waveguide is different.

6. The optical mode converter of claim 1, wherein the optical mode converter is fabricated in the PIC.

7. The optical mode converter of claim 1, wherein a structure of the Transitional waveguide structure is dependent on the number of layers in the multi-layer waveguide.

8. The optical mode converter of claim 7, wherein the single waveguide of the Single waveguide structure is connected to the first inversed taper of the Transitional waveguide structure,
   wherein the first inversed taper extends toward the Multi-layer waveguide structure and is surrounded by extensions of the multi-layers of the Multi-layer waveguide structure,
   wherein a cross-section area of the first inversed taper decreases while approaching the Multi-layer waveguide structure,
   wherein the optical mode size increases as the cross-sectional area of the first inversed taper decreases, and
   wherein light in the first inversed taper with the expanded optical mode couples to the multilayer structure via evanescent field coupling and forms a large area optical mode when propagating in the Multi-layer waveguide structure.

9. The optical mode converter of claim 7, wherein each layer of the Multi-layer waveguide structure has one or more waveguides at a same vertical level, and wherein the extensions of the one or more waveguides at each layer are connected to second inversed tapers in the transitional waveguide structure.

10. The optical mode converter of claim 9, wherein two or more layers of the multi-layer waveguide structure are extended and connected to the second inversed tapers in the transitional waveguide structure, and wherein dimensions of the second inversed tapers corresponding to the two or more layers are different.

11. The optical mode converter of claim 1, wherein a waveguide in the Transitional waveguide structure is in contact with the single waveguide in the single waveguide structure and the layer around the center of the optical mode in the Multi-layer waveguide structure directly, when the single waveguide of the Single waveguide structure has a same vertical position and a same height of the layer around the center of the optical mode in the Multi-layer waveguide structure.

12. The optical mode converter of claim 11, wherein the waveguide in the Transitional waveguide structure is a tapered waveguide, with one end having a same area as the single waveguide of the Single waveguide structure, and expands in width towards the layer around the center, of the optical mode, in the Multi-layer waveguide structure until matching at least one of a width and an area of the layer around the center.

13. The optical mode converter of claim 12, wherein one part of the single waveguide connects to the tapered waveguide in the Transitional waveguide structure and another part, caused by extra height, of the single waveguide is connected to the first inversed taper interposed on the tapered waveguide which expands to match and connect the layer around the center of the optical mode in the Multi-layer waveguide structure, when the single waveguide of the Single waveguide structure has the same vertical position of the layer around the center of the optical mode in the Multi-layer waveguide structure with an odd number of layers and a waveguide height of the single waveguide is greater than that of the layer around the optical mode center of the Multi-layer waveguide structure.

14. The optical mode converter of claim 1, wherein materials of respective layers of the multi-layer waveguide structure are different, and wherein the materials of the layers of the multi-layer waveguide structure are different from a material of the single waveguide in the single waveguide structure.

* * * * *